3,737,510
HIGH STRENGTH CONCRETE

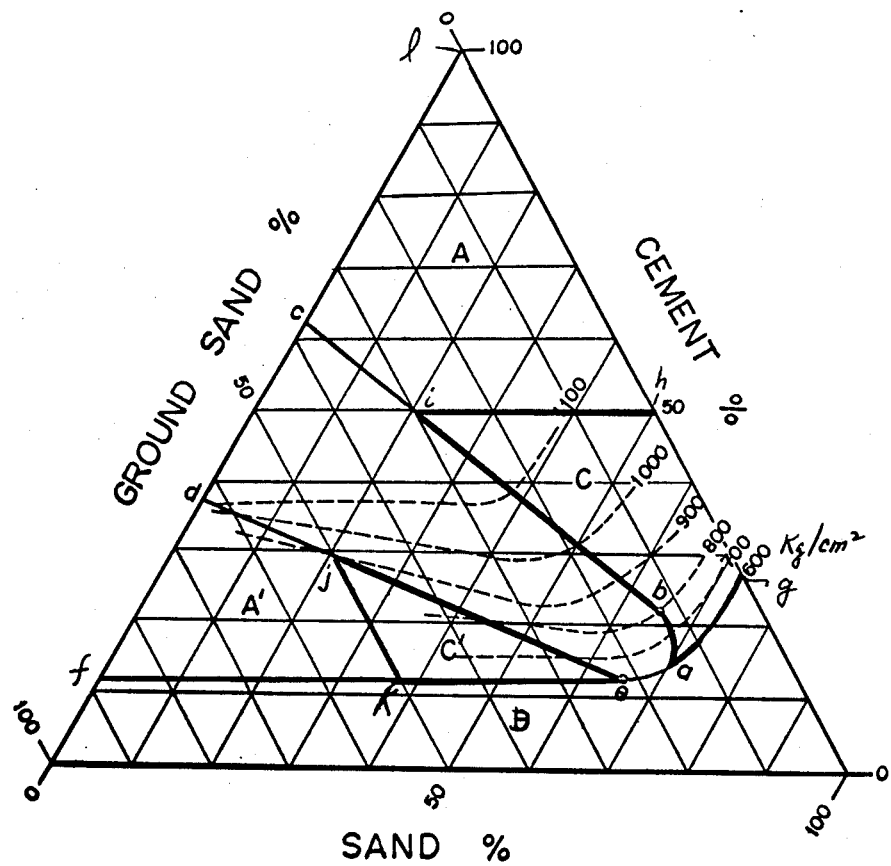

Mareaki Takaki, Matsudo, Japan, assignor to Asahi Kasei Kogyo Kabushiki Kaisha, Osaka, Japan
Continuation-in-part of application Ser. No. 740,199, June 26, 1968. This application Mar. 16, 1971, Ser. No. 124,727
Claims priority, application Japan, July 7, 1967, 42/43,352
Int. Cl. B29c 5/04
U.S. Cl. 264—234                                8 Claims

ABSTRACT OF THE DISCLOSURE

Hollow, cylindrical, concrete products having a compressive strength of at least 600 kg./cm.$^2$ are formed from specified mortar mixtures of cement, ground sand having a specific surface of 1000–3000 cm.$^2$/g. and, optionally, a sand having a specific surface area of 45–85 cm.$^2$/g. The mixture is cast with centrifugal force, and the resulting casting is cured with steam under specified conditions.

RELATED APPLICATION

This application is a continuation-in-part of application Ser. No. 740,199, filed June 26, 1968 and now abandoned.

FIELD OF THE INVENTION

This invention relates to a method of making hollow cylindrical concrete product having high compressive strength, bending strength and tensile strength. The product is made by a combination of the use of a mortar obtained by mixing cement and ground sand in a specific proportion, the adoption of a centrifugal moulding technique to shape (cast) the mortar thus obtained into a desired configuration and the curing of the resulting centrifugally shaped (cast) body in an autoclave.

BACKGROUND OF THE INVENTION

The hollow cylindrical concrete products of the method invention are widely used for example, as structural piles, poles, pipes and the like, and the demand has been increased considerably in recent years.

However, the mechanical strength of like products known heretofore such as the compressive strength, bending strength and tensile strength, has been rather unsatisfactory, in particular, the compressive strength of a centrifugally shaped concrete pile is about 530 kg./cm.$^2$ at the most, and increase in the mechanical strength thereof has been desired.

Taking a construction concrete pile for example, the pile is required to bear an increased load exerted vertically thereon and to be embedded sufficiently deep into a hard bearing foundation to keep step with the current increase in size of such structures.

In the penetration of the pile through an intermediary ground layer and the embedment thereof into a bearing foundation, a great impact is exerted on the pile by way of hammering. In this instance, the use of a concrete pile known heretofore having a compressive strength of about 530 kg./cm.$^2$ at the most often leads to inconveniences such as broken top and buckled tip, so that steel piles are often used in place of the concrete piles.

However, the steel piles are unsatisfactory from both economical and material standpoints since they are not only expensive but also easily corroded.

For these reasons mentioned above, the advent of a high strength concrete pile having a greater mechanical strength than those of concrete piles known heretofore, and particularly a compressive strength of at least 600 kg./cm.$^2$, has been desired.

In making such high strength concrete products, although there have been attempted heretofore a number of improvements in the manufacturing process involving mixing of concrete, shaping and curing, there has been found no method capable of making a high strength concrete product having a compressive strength of greater than 600 kg./cm.$^2$ economically which is applicable to the making of huge cylindrical concrete products such as construction piles, poles, pipes and the like.

In the past, the following compositions for concrete mixing as shown in Table 1 have been used in the manufacture of concrete piles by a centrifugal casting method.

However, the compressive strength of the resulting product only ranges from 400 to 530 kg./cm.$^2$.

TABLE 1

| Type of centrifugal piles | Maximum dimension of coarse aggregate (mm.) | Slump (cm.) | Water-cement ratio (percent) | Weight of cement per unit volume of concrete (kg.) | Weight of water per unit volume of concrete (kg.) | Fine aggregate percentage (percent) | Compressive strength (kg./cm.$^2$) | Remarks |
|---|---|---|---|---|---|---|---|---|
| RC pile [a] (Average example) | 25 | 4–6 | 40 | 430 | 172 | 42 | 450 | Mix of gravel and crushed stone is used as a coarse aggregate. |
| PC pile [b] (Average example) | 25 | 4–6 | 35 | 500 | 175 | 42 | 530 | Do. |
| RC pile [a] (Example of 6 makers) | 25 | 3–7 | 38–43 | 390–430 | 150–175 | 35–40 | 400–500 | Air-entraining agent is used when the weight of water per unit volume of concrete is less. |

[a] = Reinforced concrete pile.
[b] = Prestressed concrete pile.

Generally speaking, a highly compact concrete product having a greater mechanical strength may be obtained by centrifugal shaping in which water is removed by taking advantage of the difference in the specific gravity.

However, the use of conventional mortar mixtures in place of the concrete mixture having compositions shown in Table 1 used heretofore in the making of centrifugal concrete manufactures leads to disadvantages. There is required an increased amount of cement per unit volume of concrete, thus degrading economy and there is a necessity for higher water-cement ratios to improve the workability, leading to deterioration in the mechanical strength of the resulting product as well as an undesirably high degree of shrinkage thereof when dried caused by flowing out of cement paste in the mortar in the course of centrifugal shaping.

Similarly, the use of a concrete mixture containing a greater mortar portion and having a high fine aggregate percentage gives rise to a disadvantage in that when compaction by centrifugal force is effected, there is formed a separated, thick laitance inside the shaped body causing non-uniformity in the structure and the mechanical strength of the resulting product is deteriorated thereby.

Hence, for the reasons mentioned above, it has been considered impossible to make hollow cylindrical concrete manufactures having high strength economically with good workability by centrifugal shaping using a mortar mixture or a concrete mixture similar thereto.

SUMMARY OF THE INVENTION

It is, therefore, an object of this invention to provide a method of making concrete construction pile, pole, pipe and the like having high mechanical strength which may be worked easily and economically.

In accordance with this invention, there is provided a method of making a concrete product having a compressive strength greater than 600 kg./cm.$^2$. This product is obtained with good workability, using a lesser amount of cement than that required in making conventional concrete products. The products are prepared by using a special mortar mixture consisting of cement and ground sand, more particularly, 300–500 parts by weight of cement, 300–500 parts by weight of ground sand having a specific surface area of 1000–3000 cm.$^2$/g. and, if required, not more than 1500 parts by weight of sand having a fineness modulus of 2.5–3.2 or a specific surface area of from 45 to 85 cm.$^2$/g., in place of conventional concrete mixtures known heretofore in which coarse aggregate is admixed. The resulting mortar mixture is shaped (cast) according to centrifugal moulding method into a cylindrical body and the resulting shaped body is cured at a high temperature under a high pressure.

SPECIFIC EMBODIMENTS OF THE INVENTION

In accordance with the method of this invention, there is obtained a hollow cylindrical concrete product having a compressive strength greater than 600 kg./cm.$^2$ without being accompanied by the drawbacks which characterize prior art products by a combination of the use of special mortar mixtures consisting of ground sand having a specific fineness and an active fractured surface as set forth hereinbefore and cement, adoption of the centrifugal shaping technique and curing at a high temperature and under a high pressure.

In the method of this invention, there is obtained a condition under which active fractured surfaces of finely ground sand and similarly fine and active particles of cement are brought into secure contact by powerful compaction by the action of centrifugal force and the hardening reaction between the ground sand and cement proceeds easily and promptly by subjecting the resulting centrifugally shaped body to a curing treatment at a high temperature under a high pressure. And, as a result, the mechanical strength of the product concrete manufacture is enhanced substantially.

It is essential that the ground sand used has a specific surface area of 1000–3000 cm.$^2$/g. The ground sand defined as above which may be used in the method of this invention is far finer than common sand which has a specific surface area ranging from 45 to 85 cm.$^2$/g., and the fineness of the ground sand referred to herein is rather close to that of cement which has a specific surface area of more than about 3000 cm.$^2$/g.

For this reason, as the substitution of fly ash for a part of cement in a concrete mixture improves the workability thereof, in the mortar mixture of this invention as well, the fine ground sand improves the workability thereof. In addition, unlike fly ash, fine ground sand having a specific surface area ranging from 1000 to 3000 cm.$^2$/g. has approximately the same specific gravity as that of cement so that there is no difference in specific gravity to cause separation at the time of centrifugal shaping. Thus, in the concrete mixtures of this invention, the workability may not be harmed notwithstanding the use of no coarse aggregate such as gravel, and, unlike using conventional mortar consisting of common sand and cement, there is no necessity for increasing the amount of water per unit volume of concrete to improve the workability.

As a result, the centrifugal shaping can be carried out without fear of cement paste flowing out and there can be manifested effects in the savings of the amount of cement used and in the prevention of deterioration in the strength of the products.

Since no coarse aggregate such as gravel but the ground sand having specific fineness as defined hereinbefore is used, there is obtained by centrifugal shaping a concrete product having high compactness and uniform structure which exhibits high mechanical strength. In addition, the resulting shaped body is free from bubbles and hollows containing water caused by the presence of coarse aggregate in the structure which are often found in shaped bodies manufactured by centrifugal shaping using conventional concrete mixtures containing coarse aggregate, so that deaeration and dehydration of the shaped body can be accomplished easily and there can be obtained a shaped body having uniform structure.

Hence, unlike when using conventional concrete mixtures, the shaped body product has practically no separated layers (which do not contribute to the strength thereof), so that the product has an increased strength. Furthermore, the time required for finishing the inside surface of the product may be reduced to a half of that required when using conventional concrete mixtures.

In the shaped body of this invention, particles of cement are intimately contacted with active fractured surfaces of ground sand by the combination of the use of a special mortar mixture consisting of ground sand having a specific fineness and cement and the adoption of centrifugal shaping technique. It is considered that when the resulting shaped body is subjected to a steam curing at a high temperature under a high pressure, the reaction between the active fractured surface of the ground sand and lime contained in cement proceeds easily and quickly and, as a result, there is obtained a product having increased mechanical strength.

Advantages achieved with the use of mortar mixtures in making the new concrete products include the following:

In the first place, since sand which may be supplied in abundance is used in place of gravel as a coarse aggregate which is in shortage nowadays, the manufacture is economical and gravel resources are preserved.

In the second place, reinforcement of the concrete products with iron bars may be worked out quite easily and conveniently. That is, when using a concrete mixture containing coarse aggregate as heretofore, the spacing of reinforcing bars is restricted by the maximum diameter of the coarse aggregate used so that narrowing of the space between these reinforcing bars cannot be done at one's will. Thus, for example, it has been difficult to reinforce a pile with a reinforcing member at its top portion. However, when using the mortar mixtures of this invention, the spacing of reinforcing members can be chosen optionally and easily to provide the product necessary strength.

In the third place, since the mortar mixtures of this invention contain no coarse aggregate, a mortar pump or the like apparatus may be conveniently employed in the grouting operation and working efficiency can be enhanced greatly.

Cements which may be used for preparing mortar in the method of this invention include normal portland cement, high-early-strength portland cement and portland blast-furance cement, which are used for making conventional concrete manufactures known heretofore.

Ground sands which may be used for the mortar in the method of this invention include pulverized silica sand and silica sand having a specific area ranging from 1000 to 3000 cm.$^2$/g., preferably ranging from 1500 to 3000 cm.$^2$/g.

A specific surface area less than about 1000 cm.$^2$/g. leads to degradation in the mechanical strength of the resulting product. The product does not have a compressive strength greater than 600 kg./cm.$^2$. A specific surface area exceeding 3000 cm.$^2$/g. is disadvantageous in that prolonged times for grinding the sand are required as well as additional expenses therefor. The contribution to the strength of the resulting concrete products is not substantial and the workability of the mortar mixture may be decreased.

In this invention, although the use of ordinary sand is not essential, it may be used, if desired, for economical reasons. In other words, although the use of ground sand alone and no ordinary sand is ideal because the strength of the resulting concrete manufacture is quite high, in turn, the cost becomes high so that ordinary sand having a fineness modulus ranging 2.5–3.2 may be used together with the ground sand to lower the manufacturing cost. However, the amount of ordinary sand is required to be less than 1500 parts by weight related to the above-mentioned amounts of cement and ground sand, since an excessive amount thereof deteriorates the strength of the resulting concrete manufacture.

The following Experiments Nos. 1–4 illustrate that the use of 300–500 parts by weight of cement and 300–500 parts by weight of ground sand having a specific surface area of 1000 to 3000 cm.$^2$/g. are critical in order to obtain a high-strength cylindrical concrete manufacture having a compressive strength greater than 600 kg./cm.$^2$.

EXPERIMENT NO. 1

The instant experiment illustrates the influences of fineness of ground sand on strength of the resulting manufacture.

Experiment conditions (1) Materials:
 Cement: Normal portland cement (Product of Ube Kosan Co., Ltd.).
 Ground sand: Prepared by grinding soft silica excavated at Ukuzu, Shizuoka, Japan.
 Sand: Excavated at Fuji River, Shizuoka, Japan, having a fineness modulus of 2.80 and a specific area of 70.3 cm.$^2$/g.
(2) Centrifugal casting conditions:
 For 2 minutes with centrifugal force of 1.5 G. (G stands for a unit of acceleration of gravity) and 8 minutes with 50G.
 Shaping time: 2–8 min.
(3) Curing conditions:
 Preliminary curing: Steam curing at 60° C. for 10 hours.
 Final curing: High-pressure steam curing at 180° C. under 10 atmospheres (gauge pressure) for 5 hours.
(4) Mixing proportion:
 Cement—360 kg., ground sand—340 kg.
 Sand—1500 kg.

The variation in the compressive strength of the resulting product, in accordance with the change in the specific surface area of ground sand used under the conditions specified above, is as follows:

TABLE 2

| Specific surface area of ground sand (cm.$^2$/g.): | Compressive strength of the resulting product, kg./cm.$^2$ |
|---|---|
| 500 | 428 |
| 1000 | 600 |
| 1500 | 655 |
| 2000 | 710 |
| 2500 | 760 |
| 3000 | 690 |
| 4750 | 524 |

As is clear from the above table, the strength of the resulting product deteriorates when the specific surface area of ground sand used is less than 1000 cm.$^2$/g. or more than 3000 cm.$^2$/g. Particularly, in the latter case, a prolonged time and an additional cost are required for grinding the sand, and separation phenomenon likely takes place in the course of centrifugal shaping.

EXPERIMENT NO. 2

The instant experiment shows the results obtained by varying the amount of ordinary sand under the same experimental conditions as in Experiment No. 1 except that the specific surface area of ground sand was 1750 cm.$^2$/g. Thus, the quantity of cement was kept constant at 360 kg., and the quantity of ground sand at 340 kg. The results are shown in Table 3.

TABLE 3

| Parts of sand (kg.): | Compressive strength of the resulting product (kg./cm.$^2$) |
|---|---|
| 0 | 1020 |
| 500 | 903 |
| 1000 | 821 |
| 1500 | 690 |
| 2000 | 424 |
| 2500 | 355 |

From the above table, it is clear that although the strength of the resulting product decreases as the amount of sand added increases, there can be obtained a product having a compressive strength greater than 600 kg./cm.$^2$ so long as the amount remains less than 1500 kg. Hence, in accordance with this invention, there is produced a concrete product having the desired compressive strength greater than 600 kg./cm.$^2$ optionally by varying the amount of ordinary sand within the range of from 0 to the upper limit mentioned above.

EXPERIMENT NO. 3

In the instant experiment, the proportions of cement, ground sand and ordinary sand were varied under the same experimental conditions as in Experiment No. 1, except that the fineness of ground sand was 1660 cm.$^2$/g., to evaluate the strength, workability and cost with regard to the respective mixing proportions.

The results are shown in the accompanying drawing which is a ternary system diagram adopted to illustrate the mixing proportions of cement, ground sand and ordinary sand. The values designated for the respective dashed-line curves show the compressive strength (kg./cm.$^2$) of the resulting concrete products.

Referring to the accompanying drawing, the mixing proportions of respective materials at the points a, b, c, d and e are as follows:

| Point a: | Parts |
|---|---|
| Cement | 300 |
| Ground sand | 300 |
| Sand | 1500 |

Point b:
| Cement | 300 |
|---|---|
| Ground sand | 500 |
| Sand | 1500 |

Point c:
| Cement | 500 |
|---|---|
| Ground sand | 300 |
| Sand | 0 |

Point d:
| Cement | 300 |
|---|---|
| Ground sand | 500 |
| Sand | 0 |

Point e:
| Cement | 500 |
|---|---|
| Ground sand | 300 |
| Sand | 1500 |

It is noted from the diagram that the range enclosed by a line passing through points a, b, c, d and e, i.e. mortar mixtures comprising 300–500 parts by weight of cement, 300–500 parts by weight of ground sand and 0–1500 parts by weight of sand, are superior from the standpoints of the strength, workability and cost of the resulting manufacture. For example, point a shows 14% cement, 14% ground sand and 72% ordinary sand.

In the diagram, the two regions designated by A (determined by points c, i, h, l) and A' (determined by points, d, f, k, l) are regions in which relatively large proportions of ground sand and/or cement are required, and therefore represent mixtures of relatively higher cost.

The region B (determined by points f, k, e, a, g and the lower boundary) identifies mixtures which lead to products of low strength.

The region C (determined by points a, b, i, h, g) identifies compositions of high cement content; also more unit amount of water is required to obtain a predetermined consistency. Further, when casting, the thickness of a separated layer formed by fine particles of cement is increased and a casting time of 1.5–3 times greater is required than with the desired compositions in the region determined by points a, b, c, d, e. Thus, the shapability and workability in region C are degraded due to increase in viscosity of the mortar.

With compositions of region C' (determined by points e, j, k), the content of ground sand is relatively high and, as with region C, more unit amount of water is required to obtain a predetermined consistency. Thus, the shapability and workability are degraded due to a decrease in the viscosity of the mortar.

EXPERIMENT NO. 4

In the instant experiment, the strength of concrete products was tested with regard to various mortar and concrete mixtures by changing methods of compaction and curing.

The results are shown in the following Table 4:

TABLE 4

|  | No. 1 | No. 2 | No. 3 | No. 4 | No. 5 |
|---|---|---|---|---|---|
| Composition (parts by weight): |  |  |  |  |  |
| Cement | 600 | 250 | 360 | 550 | 360 |
| Ground sand | 0 | 250 | 340 | 550 | 860 |
| Sand | 1,500 | 1,500 | 1,500 | 1,500 |  |
| Gravel |  |  |  |  | 970 |
| Methods of compaction and curing (Strength, kg./cm.$^2$): |  |  |  |  |  |
| Normal curing-compaction by vibrator. | 351 (1.00) | 174 (1.00) | 213 (1.00) | 310 (1.00) | 380 (1.00) |
| Normal curing-compaction by centrifuge. | 573 (1.63) | 253 (1.45) | 369 (1.73) | 520 (1.68) | 415 (1.09) |
| Autoclave curing-compaction by vibrator. | 381 (1.08) | 340 (1.95) | 461 (2.16) | 540 (1.74) | 440 (1.15) |
| Autoclave curing-compaction by centrifuge. | 618 (1.76) | 440 (2.52) | 690 (3.24) | 815 (2.63) | 468 (1.23) |

NOTE: In the above table:
(1) Values shown in parentheses are indexes calculated by designating the strengths of respective compositions with normal curing and compaction by a vibrator as 1.00.
(2) The following materials were used in the tests: Cement: Normal portland cement. Ground sand: Prepared by grinding soft silica excavated at Ukuzu to a specific surface area of 1,600 cm.$^2$/g. Sand: Excavated at Fuji River, having a fineness modulus of 2.80 and a specific surface area of 70.3 cm.$^2$/g. Gravel: Excavated at Fuji River, having a fineness modulus of 7.5.
(3) Mortar consistency: Flow value 145± 5 mm. (JISR 5201–1964).
(4) Centrifugal casting condition: For 2 min. with a centrifugal force of 15G and 8 min. with 50G. G being unit for acceleration of gravity.
(5) Preliminary curing condition: At 60° C. for 10 hours (Temperature rising 15–20° C./hr.).
(6) Normal curing condition: Water curing at 21° C., 4 weeks strength $\delta_{28}$. The symbol "$\delta_{28}$" signifies a compression strength of a concrete product aged 28 days, having been demolded after 24 hours following casting and subsequently cured in water at 21°± 3° C. for 27 days.
(7) Autoclave condition: Pressure: 10 kg./cm.$^2$. The pressure was raised to 10 kg./cm.$^2$ (gauge) in the course of 2 hours and so maintained for 5 hours. Then, it was reduced to atmospheric pressure in the course of 2 hours.

As can be noted from the above table, when a mortar mixture consisting of cement, ground sand and sand defined in this invention is centrifugally shaped and cured at a high temperature under a high pressure, there is obtained a concrete product having a greater strength than products obtained by using other mortar mixtures or concrete mixtures outside this invention, or adopting other shaping methods or curing methods than specified in this invention.

In working the method of the present invention, a mortar mixture is prepared by mixing cement, ground sand, sand, and, if required, various additives such as an air-entraining agent, hardening accelerator, etc., adding a predetermined amount of water, and kneading the resulting mixture. Then, the mortar mixture is poured into a mould with or without setting reinforcing members and shaped by subjecting it to centrifugal force.

Before subsequently subjecting the shaped body to a steam curing at a high temperature and a high pressure, it is advantageous to carry out a preliminary curing tentatively with steam at atmospheric pressure and remove the shaped body from the mold when its compressive strength reaches 100–300 kg./cm.$^2$ for the subsequent final steam curing, in order to avoid damage of expensive moulds and to improve turnover thereof.

As is well known, high temperature steam curing is preferably carried out by raising the pressure of a saturated steam for atmospheric level to 8–10 atmospheres (gauge) and maintaining the pressure at this level for 5–10 hours, then, reducing the pressure to atmospheric level.

The concrete products such as construction piles, poles, pipes or the like obtained according to this invention are superior in compressive strength and tensile strength, and are free from a tendency to crack due to local heating experienced at the time of welding the joint.

In addition, because of the high-temperature, high-pressure steam curing, the surface of the resulting products becomes particularly white, affording good appearance as well as facilitating painting or marking with paints. There is also afforded a high resistance to chemicals so that the resulting products may be conveniently used for water-supplies or sewerage systems. They may also be used endurably as poles and piles at places near the seashore where the damage caused by salty winds are considerable.

Since the concrete manufactures obtained according to this invention do not have wet surfaces as the conventional concrete manufactures known heretofore, coating of the surface with resins can be accomplished quite easily.

The following examples will serve to illustrate this invention more fully. It should not be construed, however, that these examples restrict this invention as they are given merely by way of illustration.

Example 1

There were mixed 72 kg. of a normal portland cement, 68 kg. of a ground sand which was prepared by wet grinding a sand excavated at the Arakawa River in a rod mill to a specific surface area of about 2000 cm.$^2$/g., 300 kg. of sand having a fineness modulus of 2.80 and a specific surface area of 70.3 cm.$^2$/g. (excavated at Fuji River), and sufficient water in a forced agitation type mixer to give a mortar having a flow value of about 140 mm. The resulting mortar was poured into a mould and shaped by a centrifugal shaping machine at a low speed for 2 minutes, then with a centrifugal force of 35G for 8 minutes.

The shaped body thus obtained was then subjected to a preliminary steam curing at 60° C. under atmospheric pressure and the demoulded body was further subjected to another saturated steam curing at a temperature of 180° C. which corresponds to about 10 atmospheres (gauge) for 7 hours. After the pressure was released in the course of two hours, the cured body was allowed to stand for a suitable period to cool and there was obtained a concrete product having a compressive strength of 690 kg./cm.$^2$.

Example 2

There were mixed 72 kg. of a normal portland cement, 68 kg. of a ground sand prepared by wet grinding of sand excavated at the Arakawa River in a rod mill to a specific surface area of about 2000 cm.$^2$/g., 300 kg. of a sand having a fineness modulus of 3.10 and a specific surface area of 48.6 cm.$^2$/g. and sufficient water in a forced agitation type mixer.

The resulting mortar mixture was poured into a mould, shaped and cured according to the same procedures as described in Example 1 and there was obtained a concrete product having a compressive strength of 631 kg./cm.²

Example 3

There were mixed 40 kg. of a normal portland cement, 40 kg. of a ground sand prepared by wet grinding a soft silica excavated at Ukuzu in a rod mill to a specific surface area of about 1700 cm.²/g. and water in a forced agitation type mixer. The resulting mortar mixture was poured into a mould having an outer diameter of 15 cm. and a height of 30 cm., shaped in a centrifugal shaping machine at a low speed for 2 minutes, then with a centrifugal force of 35G for 8 minutes, subsequently preliminarily steam cured at 60° C. under atmospheric pressure, and demould followed by a final saturated steam curing at 180° C. for 7 hours. After the pressure was released in the course of two hours, the resulting cured body was allowed to stand to cool and there was obtained a concrete product having a compressive strength of 1250 kg./cm.²

Example 4

A series of experiments were conducted to evaluate the influence of treatment of a centrifugally cast hollow concrete product in an autoclave under various pressures (accordingly at various temperatures) on the strength of the resulting product.

The treatment conditions involved a time required for the pressure to reach a constant level within the range of from 6. to 20 atmospheres of 2 hours, and various periods of time during which the constant pressure was maintained which ranged from 2.5 hours to 15.0 hours as specified in the following table. However, the time required for the constant pressure to decrease to normal pressure was fixed for 2 hours. The results obtained are tabulated in Table 5 following.

Materials employed:
  Cement: Normal portland cement.
  Ground sand:
    Silica sand from Ukuzu.
    Specific surface 1=1,880 cm.²/g.
  River sand:
    River sand from Fuji River
    Fineness modulus F.M.=2.95
    Specific surface=60.9 cm.²/g.

Composition:
  Cement: 360 parts
  Ground sand: 340 parts
  River sand: 1,500 parts
  Water: 300 parts
Consistency of mortar: 145±5 m./m.
Centrifugal casting conditions:
  Low speed: 7G (2 min.)
  High speed: 35G (8 min.)
Preliminary curing condition:
  Temperature: 65° C.
  Time: 8 hours
  Pressure: atmospheric pressure
Autoclave curing conditions:
  Period for increasing pressure: 2 hours
  Period for decreasing pressure: 2 hours
  Period for maintaining the constant pressure: As specified above
Test piece dimensions:
  For compression test: 15 cm. in diameter by 30 cm. in height cylinder (in accordance with ASTM C-21-69).
  For flexural test: 20 cm. in diameter by 250 cm. in height cylinder (in accordance with ASTM C-31-69).

As can be noted from the data in Table 5, within the scope of experimental conditions, the compression strength increases proportionally as the pressure and time increase. As to the flexural strength, it continues to increase as far as a certain time period or pressure zone, beyond that point, the rate of increase is drastically dulled, or, adversely, the flexural strength tends to be degraded. Thus, the ratio of flexural strength to compression strength decreases as the compression strength increases.

With regard to curing conditions, in order to attain the compression strength of 600 kg./cm.² or higher contemplated in the present invention, the conditions include a curing time of 5 hours or more and a pressure of 8 kg./cm.² or higher are required. The upper limits of these conditions are subjected to restriction from economy considerations and intended use of the products. For example, treatment under a pressure exceeding 15 kg./cm.² would lead to problems regarding the heat fatigue and stress corrosion of the mold material. Since the treatment time dominates the productivity, in a factory production, more than one working cycle a day is essentially required. Considered from the aspect of use of the product, in the production of piles which are subjected to a great impact stress at the time of use, curing for more than 12 hours is undesirable since it leads to degradation of flexural strength.

In summary, considering the economy in the production of the high-strength concrete product of the present invention and physical properties of the resulting product, the most preferable autoclave treatment conditions include a pressure of from 8 to 15 kg./cm.² and a treating time of about 5 to about 10 hours. The periods required for increasing shape and size of the curing product.

TABLE 5.—INFLUENCE OF AUTOCLAVE TREATMENT CONDITIONS ON THE STRENGTH OF THE RESULTING PRODUCT

| | 2.5 hr. | | | 5.0 hr. | | | 7.5 hr. | | | 10.0 hr. | | | 12.5 hr. | | | 15.0 hr. | | |
|---|---|---|---|---|---|---|---|---|---|---|---|---|---|---|---|---|---|---|
| Pressure, kg./cm.²: | A (kg./cm.²) | B (kg./cm.²) | B/A×100 (percent) | A (kg./cm.²) | B (kg./cm.²) | B/A×100 (percent) | A (kg./cm.²) | B (kg./cm.²) | B/A×100 (percent) | A (kg./cm.²) | B (kg./cm.²) | B/A×100 (percent) | A (kg./cm.²) | B (kg./cm.²) | B/A×100 (percent) | A (kg./cm.²) | B (kg./cm.²) | B/A×100 (percent) |
| 6 | 450 | 49.6 | 11.0 | 552 | 58.1 | 10.5 | 506 | 60.3 | 10.1 | 640 | 65.1 | 10.2 | 682 | 66.9 | 10.2 | 721 | 66.6 | 9.2 |
| 8 | 524 | 55.1 | 10.5 | 643 | 70.2 | 10.9 | 731 | 76.1 | 10.4 | 820 | 82.9 | 10.1 | 859 | 81.9 | 9.5 | 869 | 78.4 | 9.0 |
| 10 | 589 | 60.2 | 10.2 | 690 | 70.8 | 10.2 | 784 | 77.4 | 9.9 | 890 | 86.3 | 9.7 | 918 | 80.5 | 8.8 | 929 | 78.6 | 8.5 |
| 12.5 | 648 | 63.1 | 9.7 | 748 | 72.9 | 9.7 | 846 | 80.9 | 9.6 | 931 | 88.9 | 9.5 | 930 | 78.2 | 8.4 | 910 | 76.1 | 8.4 |
| 15.0 | 689 | 66.8 | 9.7 | 780 | 73.5 | 9.4 | 963 | 81.1 | 9.4 | 940 | 89.1 | 9.5 | 904 | 74.1 | 8.2 | 882 | 72.1 | 8.2 |
| 17.5 | 721 | 68.6 | 9.5 | 794 | 73.9 | 9.3 | 870 | 76.1 | 8.7 | 943 | 89.1 | 9.0 | 900 | 72.2 | 8.0 | 884 | 70.8 | 8.0 |
| 20.0 | 738 | 67.9 | 9.2 | 806 | 73.4 | 9.1 | 851 | 74.3 | 8.7 | 920 | 71.1 | 7.7 | 890 | 690 | 7.8 | 858 | 65.0 | 7.6 |

NOTE.—A=Compressive strength. B=Flexural strength.

Example 5

Influence of centrifugal casting conditions is shown in this example.

In the present invention, the specified particle sizes and mixing proportions of respective materials are combined to afford a composition most suitable for centrifugal casting. In other words, a composition used in the present invention warrants an enhanced uniform mixability at the time of kneading, and prevention of separation of inner and outer layers at the time of casting, and flowing out of cement and finely divided silica matter into water under pressure.

Besides the composition of the materials, in order to obtain a high-strength concrete product with the use of a lesser amount of cement, an appropriate selection of casting conditions is an important factor.

In the centrifugal casting of piles and pipes known heretofore, the casting is accomplished by applying desired centrifugal forces in two or three steps in the combination of low-high speeds or low-medium-low speeds. With conventional concrete compositions, since they have a wide particle size distribution of cement, sand and gravel, owing to drawbacks as mentioned above, a maximum compression strength of only about 530–550 kg./cm.$^2$ is obtained unless such multiple operations as described above are carried out.

The results of experiments performed by altering centrifugal casting conditions with the use of a composition of the present invention are shown in the following:

(A) Influence of low-speed casting conditions

A concrete mixture was cast first at low speeds and subsequently subjected to a high speed condition including a centrifugal force of 35G for 8 minutes. The concrete mixture used in these experiments was the same as the one employed in Example 4. Other conditions were as follows:

Composition:
 Cement: 400 parts
 Ground sand: 340 parts (Specific surface area = 1950 cm.$^2$/g.)
 River sand: 1,500 parts
 Water: 310 parts
Consistency of mortar: 145±5 m./m.
Curing conditions:
 Temperature: 65° C.
 Time: 8 hours
 Pressure: atmospheric pressure.

Autoclaving conditions

The pressure was raised from atmospheric pressure to 10 kg./cm.$^2$ (gauge) in the course of 2 hours, then, the pressure was maintained thereat for 5 hours, and lowered to atmospheric pressure in the course of 2 hours.

Compression test piece dimensions

A hollow body measuring 150 m./m. diameter, 300 m./m. length and 40 m./m. wall thickness.

(1) Influence of casting time when the centrifugal force of 6G or 15G was maintained.

The test results were as shown below:

| Time | Variation in compression strength (kg./cm.$^2$) | | | | | | |
|---|---|---|---|---|---|---|---|
| | 15 sec. | 30 sec. | 60 sec. | 2 min. | 4 min. | 6 min. | 9 min. |
| Centrifugal force: | | | | | | | |
| 6G | 690 | 749 | 776 | 780 | 784 | 778 | 786 |
| 15G | 684 | 738 | 784 | 801 | 799 | 810 | 804 |

NOTE.—G is a gravity acceleration at the center of wall thickness of the test piece.

(2) Influence of variation in centrifugal force ranging from 2G to 20G:

The casting time was fixed for 2 minutes and the influence of low-speed casting at various G's was tested with the following results:

| Centrifugal force (G): | Compression strength (kg./cm.$^2$) |
|---|---|
| 2 | 704 |
| 4 | 772 |
| 6 | 780 |
| 9 | 792 |
| 12 | 804 |
| 15 | 801 |
| 20 | 796 |

From the foregoing results, it is noted that the low-speed conditions have little influence on the strength of the resulting product so long as the casting time is not less than 60 seconds and the centrifugal force is not less than 4G. If the treating time is shorter than 60 seconds, there cannot be obtained a product having a uniform cross-section since the thickness of separated paste layer is increased and more cement particles flow out, and the strength of the resulting product is also degraded. The greater the centrifugal force, the more remarkable this tendency becomes. It is presumed that since the centrifugal force is drastically exerted on mortar having a fluidity, the influence of particle size (or particle weight) becomes more evident than that of difference in the specific gravity between one particle and another.

At speeds producing a centrifugal force of less than 4G, no uniform layer formation on the inner wall of mold is achieved and there is caused slipping of a cast body within the mold in the tangential direction with attendant peeling and rolling in of a demolding agent to give rise to separation of aggregate (sand) and cement in the mortar, leading to deterioration in the strength.

At speeds producing a centrifugal force of higher than 4G, the sign of dehydration effect becomes clear and the thickness of inner separated layer is decreased to enhance the shapability. However, at speeds producing a centrifugal force in excess of 20G, since particles of intermediate sizes are gathered toward the center portion of the cross-section to form a layer having many air bubbles, the cross-sectional shape of the resulting product tends to be lacking in uniformity. Thus, in summary, when the productivity is taken into account, the low-speed casting conditions preferably include a casting time of from 60 seconds to 6 minutes and a speed producing a centrifugal force of from 4G to 15G.

(B) Influence of high-speed casting conditions

The same concrete mixture as used in the foregoing experiments was first cast under low-speed casting conditions including a casting speed producing a centrifugal force of 6G and a casting time of 2 minutes, and subjected to various high-speed casting conditions. Other conditions such as composition of the concrete mixture and curing conditions were the same as in experiments described under (A).

(1) Influence of casting time when the centrifugal force of 35G or 50G was maintained:

The test results were as shown below:

| Time (min.) | Variation in compression strength (kg./cm.$^2$) | | | | | | |
|---|---|---|---|---|---|---|---|
| | 4 | 6 | 8 | 11 | 14 | 17 | 20 |
| Centrifugal force: | | | | | | | |
| 35G | 706 | 754 | 780 | 808 | 826 | 838 | 841 |
| 50G | 721 | 771 | 818 | 836 | 847 | 845 | 838 |

(2) Influence of variation in centrifugal force ranging from 25G to 55G.

The casting time was fixed for 8 minutes and the influence of high-speed casting at various G's was tested with the following results:

| Centrifugal force (G): | Compression strength (kg./cm.²) |
|---|---|
| 25 | 658 |
| 30 | 736 |
| 35 | 780 |
| 40 | 798 |
| 45 | 813 |
| 50 | 818 |
| 55 | 791 |

The selection of high-speed casting conditions in the centrifugal casting is important in order to cause appropriate deaeration and dehydration with attendant strong compaction effect which affords a secure adhesion among particles. By subsequently subjecting thus cast body to a steam curing treatment under high temperature and high pressure conditions, the reaction between ground sand and cement particles as well as the curing reaction between aggregate surfaces and cement proceeds easily and promptly to give a high-strength product.

In the high-speed casting with a centrifugal force of 35G or 50G, a casting time of shorter than 4 minutes leads to somewhat unsatisfactory compaction with the formation of a separated layer inside the cast body to cause non-uniformity in both inner and outer layers with resulting deterioration in the strength. With a casting time of longer than 6 minutes, the objectionable separated layer ceases to exist and, proportionally to the casting time, the shapability is enhanced with a sufficient compaction to render the resulting product an increased specific gravity as well as an enhanced compression strength.

While such tendency as described above generally continues to prevail up to a casting time of 14 minutes, the rate of increase is dulled beyond the point of 14 minutes. A similar tendency prevails with regard to the speeds, i.e. a speed producing a centrifugal force of 25G only affords an unsatisfactory compaction and both compression strength and shapability are enhanced at speeds producing a centrifugal force greater than 30G. However, at speeds producing a centrifugal force greater than 50G, the compaction effect is killed by an unusual vibration of the mold with consequential degradation in the strength of the resulting product. Moreover, such a high-speed operation is undesirable from the standpoints of maintenance of machines and working environment, since wear of the casting machines and working noises become quite disturbing in high-speed operation.

In view of the foregoing test results, the high-speed casting conditions preferably include a casting time of from 6 to 20 minutes, most preferably from 8 to 17 minutes, and a casting speed producing a centrifugal force from 30G to 50G, most preferably 35–50G.

(C) Influence of one-step casting on the strength of the strength of the resulting product In the instant test, the time required for reaching a speed producing a centrifugal force 35G was varied within the range of from 15 seconds to 10 minutes and thereafter the speed was maintained thereat for 8 minutes. The results were as shown below:

| Time required for reaching a constant speed: | Compression strength (kg./cm.²) |
|---|---|
| 15 sec. | 668 |
| 30 sec. | 704 |
| 60 sec. | 748 |
| 2 min. | 774 |
| 4 min. | 796 |
| 6 min. | 812 |
| 8 min. | 822 |
| 10 min. | 826 |

As can be noted from above, if the time required for reaching a constant speed is not shorter than 2 minutes the separated layer disappears and the strength is stabilized, whereas if it is shorter than 60 seconds, there are caused formation of the separated layer as well as many air bubbles inside the cast body and maldistribution of particles to deteriorate the strength of the resulting product. In general, satisfactory strength and shapability are obtained when a constant speed is reached in the course of more than 60 seconds. While there is seen a degradation in the strength by 2–3% in the one-step casting as compared with the two-step operation, for all practical purposes, it can be regarded that the difference is of no consequence sequence.

As described above, in the present invention, the one-step casting method can conveniently be adopted. The term "one-step casting" is used herein in the sense that there is only one plateau in a time lapse vs. G curve (not shown).

In the one-step casting operation, the preferable casting conditions are the same as those in the high-speed casting discussed hereinbefore. When using conventional concrete mixtures known heretofore, the one-step casting leads to inconveniences as described above under the heading "Background of the Invention." In contrast, the one-step casting can be successfully adopted with the use of compositions of the present invention since they have a narrow distribution of particle sizes and are not easily separated.

So far as the curing pressure and curing time are concerned, since the present invention contemplates not only a compressive strength of more than 600 kg./cm.² but also a bending strength of more than 70 kg./cm.², final products having a bending strength of less than 70 kg./cm.² are considered outside the scope of the present invention, even if they have a compressive strength of more than 600 kg./cm.².

In the present invention, the specific surface area of sand is restricted to the range of from 45 to 85 cm.²/g., since if it is less than 45 cm.²/g., like conventional concrete compositions using gravel, when centrifugally molding, coarse sand particles are gathered about the outer peripheral portion resulting in separation and flowing out of a paste layer inside the molded product to cause non-uniformity in the outer and inner layers which, in turn, makes the production of a high strength product impossible. The specific area of sand exceeding 85 cm.²/g. causes a demerit for the reason described in lines 5–24 at page 6 of the present specification.

In the present invention, the temperature of preliminary curing is limited to the range of from 50° C. to 95° C. as set out in claim 6 for the following reason:

In an attempt to evaluate the influence of temperature of preliminary curing on the compressive strength, a series of experiments were conducted by employing the same material composition as used in Experiment No. 1 and varying the temperature and time of preliminary curing with the following results:

| Retained temperature (° C.) | Retained time of— | | | | | |
|---|---|---|---|---|---|---|
| | 3 hrs. | 5 hrs. | 7 hrs. | 9 hrs. | 11 hrs. | 15 yrs. |
| 50 | 111 | 152 | 183 | 205 | 221 | 245 |
| 65 | 129 | 170 | 202 | 230 | 250 | 270 |
| 75 | 147 | 188 | 223 | 252 | 270 | 285 |
| 85 | 160 | 206 | 244 | 270 | 286 | 298 |
| 95 | 172 | 223 | 261 | 283 | 297 | 306 |

The above figures represent compressive strength (kg./cm.²) as measured after following the steps of completing a predetermined cycle of preliminary curing, demonding the test piece and cooling the same to room temperature.

The results shown above indicate that the higher the temperature and the longer the time, the higher the compressive strength becomes. However, considering the correlation with the strength after autoclaving, it is possible that in a test piece having been given a high strength in the preliminary curing, the rate of increase in the strength in the subsequent autoclaving could even be lowered.

When dealing with lengthy articles such as, e.g. piles and poles, preferable conditions for preliminary curing according to the present invention are those capable of affording a compressive strength of 100–300 kg./cm.², most preferably 150–300 kg./cm.², though they depend upon the size and weight of contemplated product.

According to the tabulation shown above, the preferred strength mentioned above can be attained with a preliminary curing time of more than 5 hours at temperatures lower than 75° C. and that of more than 3 hours at temperatures higher than 85° C. However, when dealing with a sizable product, a preliminary curing strength of more than 200 kg./cm.² is necessitated and a prolonged period of time is required to attain the required strength if lower temperatures were used. Thus, in practical factory operation, in order to avoid working defficiency, a temperature ranging from 55° C. to 65° C. is generally employed. In the Japanese Industrial Standards, the maximum temperature for preliminary curing of cement/concrete product is set at 65° C. on account of influence of high temperature curing on physical properties of the product.

In the present invention where a special mortar mixture is employed, unlike conventional mortar or concrete mixture, the high temperature curing may be adopted with satisfactory results free from any adverse influence on the strength. However, temperatures higher than 95° C. lead to an economical disadvantage in that the rate of increase in the strength becomes smaller even though the treating time is made longer. In addition, there is caused a drawback in regard to physical properties in that such high temperature curing results in escape of water from the surface of test piece to cause a difference in shrinkage between the surface and inner portions of test piece at an early stage of curing with attendant formation of microcracks. As a result, there is observed a phenomenon wherein the compressive strength of a test piece preliminarily cured at temperatures higher than 95° C. measured after the subsequent autoclave treatment becomes lower than that of a test piece having been preliminarily cured at temperatures lower than 95° C.

In view of the foregoing, the conditions for preliminary curing according to the present invention preferably include a temperature of from 50° C. ton 95° C. and a time of more than 3 hours. On the other hand, the preliminary curing strength is influenced by the amount of cement used in the mixture.

Examples illustrating the use of cement within the range of 300–500 parts by weight are shown below. In these examples, the preliminary curing conditions adopted were a temperature of 65° C. and a time of 9 hours.

| Unit amount of cement parts by weight: | Compressive strength (kg./cm.²) |
|---|---|
| 300 | 194 |
| 350 | 225 |
| 400 | 252 |
| 450 | 278 |
| 500 | 304 |

As described above, it goes without saying that the conditions for preliminary curing are to be properly selected within the ranges set forth hereinbefore depending upon the unit amount of cement used and size, weight and required strength of contemplated product.

What is claimed is:

1. A method of making a hollow, cylindrical, concrete product having a compressive strength of at least 600 kg./cm.² and a bending strength of more than 70 kg./cm.², consisting essentially of
   (a) forming a mortar mixture consisting essentially of (i) 300–500 parts by weight of cement, (ii) 300–500 parts by weight of ground sand having a specific surface area of 1000–3000 cm.²/g., (iii) 0–1500 parts by weight of sand having a specific surface area of 45–85 cm.²/g., and (iv) water,
   (b) casting said formed mortar with a centrifugal force of from about 30 to about 50G for from about 6 to about 20 minutes to form said mortar to said shape,
   (c) subjecting said casting within a mold to preliminary curing at atmospheric pressure with steam, until the compressive strength of said casting has reached 100–300 kg./cm.²,
   (d) removing said casting from said mold and within an autoclave subjecting said casting to a final curing with steam under a pressure of at least about 8 kg./cm.² to about 15 kg./cm.² for from about 5 hours to about 12 hours, and
   (e) allowing said casting to stand and cool, resulting in said product of said strength.

2. The method of claim 1, wherein the temperature of said curing in step (c) is from about 50° C. to about 95° C.

3. The method of claim 1, wherein the curing time of step (d) is from about 5 hours to about 10 hours.

4. The method of claim 1, wherein (iii) is zero in step (a).

5. A method of making a hollow, cylindrical, concrete product having a compressive strength of at least 600 kg./cm.² and a bending strength of more than 70 kg./cm.², consisting essentially of
   (a) forming a mortar mixture consisting essentially of (i) 300–500 parts by weight of cement, (ii) 300–500 parts by weight of ground sand having a specific surface area of 1000–3000 cm.²/g., (iii) 0–1500 parts by weight of sand having a specific surface area of 45–85 cm.²/g., and (iv) water,
   (b) casting said mortar with a centrifugal force of from about 4 to about 15G for from about 1 minute to about 6 minutes and then with a centrifugal force of from about 30 to about 50G for from about 6 to about 20 minutes,
   (c) subjecting said casting within a mold to preliminary curing at atmospheric pressure with steam, until the compressive strength of said casting has reached 100–300 kg./cm.²,
   (d) removing said casting from said mold and within an autoclave subjecting said casting to a final curing with steam under a pressure of at least about 8 kg./cm.², and to about 15 kg./cm.² for from about 5 hours to about 12 hours, and
   (e) allowing said casting to stand and cool, resulting in said product of said strength.

6. The method of claim 5, wherein (iii) is zero in step (a).

7. The method of claim 5, wherein the temperature of said curing in step (c) is from about 50° C. to about 95° C.

8. The method of claim 5, wherein the curing time of step (d) is from about 5 hours to about 10 hours.

References Cited

UNITED STATES PATENTS

| 1,480,740 | 1/1924 | Barkschat | 264—311 |
| 2,751,308 | 6/1956 | Arrighini | 106—98 |
| 2,880,101 | 3/1959 | Ulfstedt | 106—98 |
| 2,898,220 | 8/1959 | Ulfstedt | 106—98 |

OTHER REFERENCES

W. H. Taylor, Concrete Technology and Practice. American Elsevier Publishing Co., 1965.

ROBERT F. WHITE, Primary Examiner

J. R. HALL, Assistant Examiner

U.S. Cl. X.R.

264—311

UNITED STATES PATENT OFFICE
CERTIFICATE OF CORRECTION

Patent No. 3,737,510              Dated June 5, 1973

Inventor(s) Mareaki Takaki

It is certified that error appears in the above-identified patent and that said Letters Patent are hereby corrected as shown below:

Column 1, Title: should read -- METHOD OF MAKING HIGH STRENGTH CONCRETE --. Column 5, line 68, "$cm^2$%g" should read -- $cm^2/g$ --. Columns 9-10, right side, penultimate line: after "increasing" cancel "shape and size of the curing product" and insert -- and decreasing the pressure vary depending upon the shape and size of the curing product. --. Column 14, line 12, after "consequence", delete "sequence".

Signed and sealed this 24th day of September 1974.

(SEAL)
Attest:

McCOY M. GIBSON JR.
Attesting Officer

C. MARSHALL DANN
Commissioner of Patents